Aug. 27, 1963 B. L. VALLEE 3,102,155
BACKGROUND COMPENSATION FOR SPECTROMETERS USED
IN QUANTITATIVE SPECTRO-CHEMICAL STUDIES
Filed Feb. 16, 1955 4 Sheets-Sheet 1
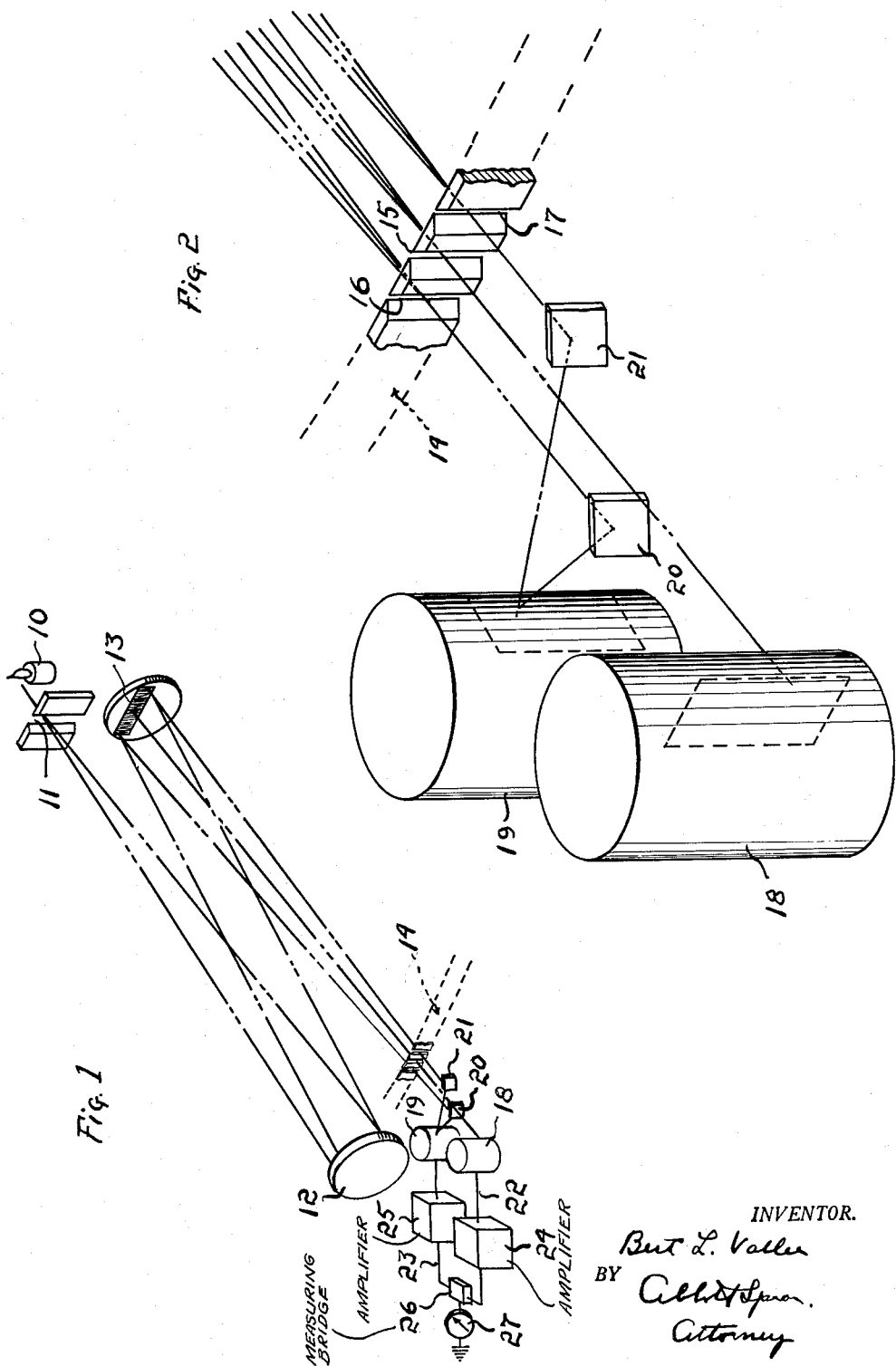
INVENTOR.
Bert L. Vallee
BY
Attorney

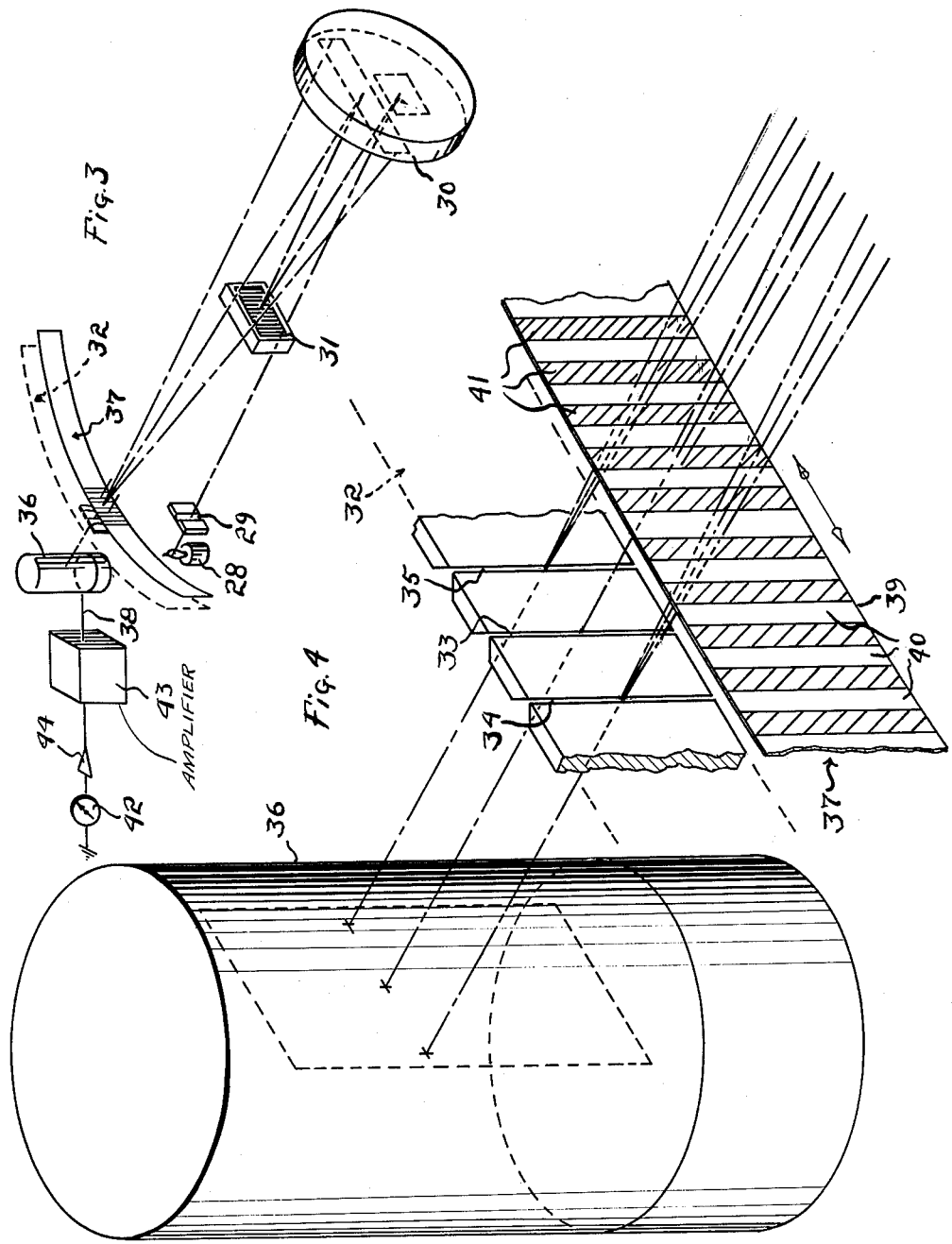

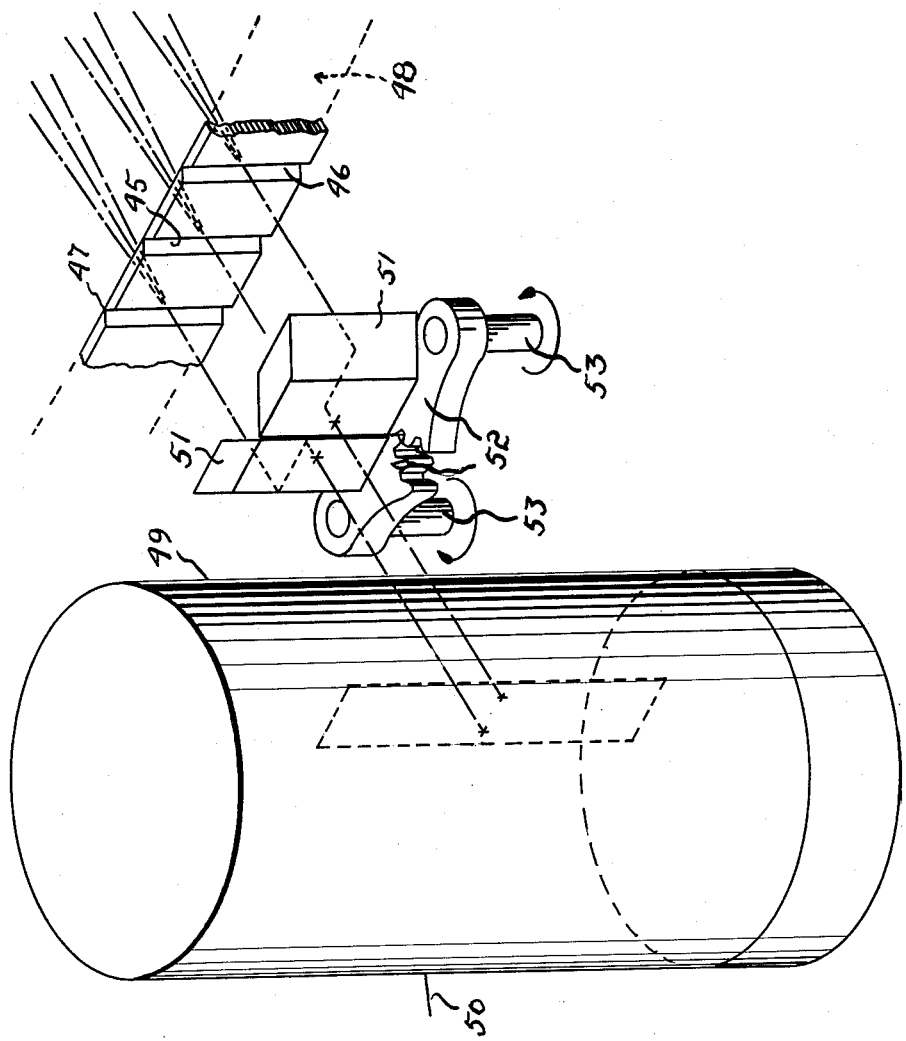

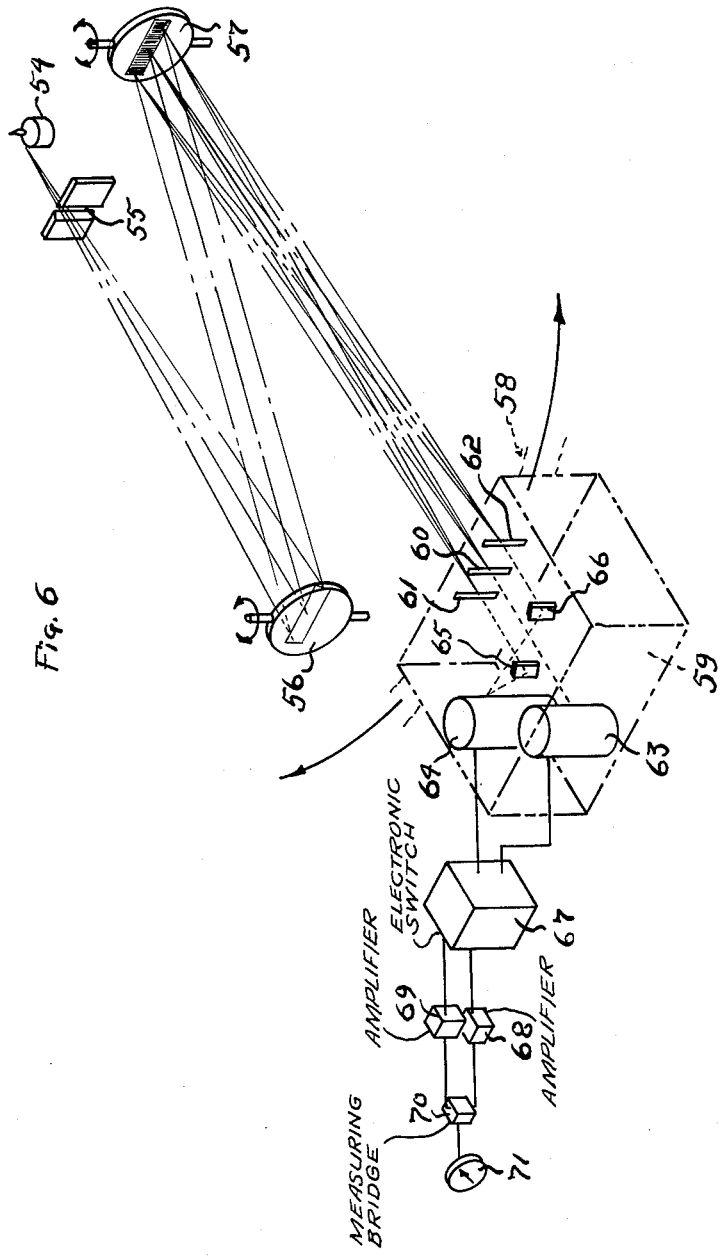

United States Patent Office 3,102,155
Patented Aug. 27, 1963

3,102,155
BACKGROUND COMPENSATION FOR SPECTROMETERS USED IN QUANTITATIVE SPECTROCHEMICAL STUDIES
Bert L. Vallee, Brookline, Mass., assignor to Technicon Instruments Corporation, Chauncey, N.Y., a corporation of New York
Filed Feb. 16, 1955, Ser. No. 488,584
4 Claims. (Cl. 88—14)

This invention relates to spectrometers and particularly to those for use in quantitative spectrochemical studies.

Where the presence of a chemical element in a substance is to be quantitatively determined in the presence of other chemical elements by measurement of a selected spectral frequency, characteristic of the chemical element in an excited state, background radiations, always present with and added to the selected spectral frequency, independent of the method of excitation, present a troublesome problem. Such light, representing black body and other radiations from the light source, is always present and the error that it makes possible is a function of its intensity and the ratio of its intensity to that of the seleced spectral frequency to be determined.

The principal object of the invention is to provide means to compensate for the background light as a source of error in quantitative spectro-chemical analyses. This objective is attained by providing means for measuring the combined energies at the selected spectral frequency of the chemical element to be measured and of the background radiations present independent of their origin, and subtracting therefrom backgound radiations measured in a zone exclusive of characteristic frequencies of any element present. Such measurements may be made simultaneously or alternately and the two, when converted into electric signals, may be readily utilized to provide the requisite compensation for an accurate quantitative determination of the element to be made independent of variations in other chemical elements present, even in multi-channel flame spectrometers.

While the invention embraces a wide range of instruments, with a corresponding range of light sources and methods of exciting them, dispersing elements, and receivers, there are shown, in the accompanying drawings, several illustrative embodiments of the invention which make apparent its objectives, novel features, and advantages.

In the drawings:

FIG. 1 is a schematic perspective illustrating one embodiment of the invention in which a selected frequency, characteristic of the element, and background radiations, exclusively, are simultaneously converted to electrical energy.

FIG. 2 is a fragmentary showing, on an increased scale, of the principles of the invention illustrated by FIG. 1.

FIG. 3 is a view similar to FIG. 1 but illustrating an embodiment of the invention in which shutter means isolate and deliver light energy at the selected frequency of the element and background radiations, exclusively, in the alternative to means converting said energy to electrical energy.

FIG. 4 is a fragmentary showing, on an increased scale, of the principles of the invention illustrated by FIG. 3.

FIG. 5 is a schematic and fragmentary perspective illustrating another type of shutter means in accordance with the invention, and FIG. 6 is a schematic perspective view illustrating, in a typical spectrometer, means by which the selected spectral frequency can be separated from background radiations as by relative scanning motion between the dispersing device and the means isolating light energy and converting it into signal producing electrical energy.

In FIG. 1, there is schematically illustrated a spectrometer in accordance with the invention and employing a Wadsworth type of optical mounting. Such a spectrometer is well adapted for use in quantitative spectrochemical studies with a flame or other light source 10 and has a slit 11 by which light is channeled to a mirror 12 directing the light beam to the dispersing device 13 by which there is provided a display of spectral frequencies in a focal curve, a portion of which is generally indicated at 14.

In order to illustrate the invention, there is shown a slit 15, located at a selected frequency characteristic of the element in the sample that is to be quantitatively determined, thus to isolate and provide a source of light energy at that frequency. Slits 16 and 17 are located on opposite sides of the slit 15 with their location being selected at zones exclusive of frequencies characteristic of any element thus to isolate black body and other radiations and provide a source exclusively of that light energy.

Light energy isolated by the slit 15 is directed to the transducer 18 while light energy isolated by the slits 16 and 17 is directed to the transducer 19 by mirrors 20 and 21. The transducers 18 and 19 are operable to convert light energy to electrical energy which is simultaneously delivered to the indicating means, presently to be described, through the leads 22 and 23, respectively.

It will be appreciated that the reading of the indicating means must represent the isolated frequency of the selected element less the background radiations actually present. As illustrative of means ensuring that the background radiations are accurately determined, the slits 16 and 17 are shown as being somewhat narrower than the slit 15 so that the total light energy isolated by the former slits is approximately equal to the background radiations also contained in the light energy isolated by the slit 15.

While the indicating means may be of any type desired to give an accurate reading such are shown in FIG. 1 as comprising a pair of matched amplifiers 24 and 25 in the leads 22 and 23 respectively. These are both connected to the measuring bridge 26 enabling the display on the microammeter 27 to be the signal which represents the corrected signal of the element to be measured at the selected spectral frequency.

In FIGS. 3 and 4, there is generally indicated an Ebert type of spectrometer in accordance with the invention. In this embodiment, the flame 28 is illustrative of a typical light source with a slit 29 directing its light beam to the concave mirror 30 by which it is reflected to the dispersing device, shown as a diffraction grating 31. From the grating 31, the beam passes back to the mirror 30 by which the display of spectral frequencies is brought to focus on the focal curve as suggested at 32.

A slit 33 is located with reference to the focused display 32 to isolate a selected characteristic frequency of one of the chemical elements of the sample and to provide a source of light energy at that frequency position. The slit 33 is shown as being flanked by slits 34 and 35 which are located in zones exclusive of frequencies characteristic of any chemical element present thereby to isolate background radiations and provide a source of background light energy.

While the light energy thus isolated by the slit 33 and the slits 34 and 35 may be simultaneously converted to electrical energy as disclosed by FIGS. 1 and 2, a single transducer 36 is shown as disposed to receive light energy from both sources. For this reason, shutter means, generally indicated at 37, are provided so that light from the two sources is transmitted, in the alternative, to the transducer 36, shown as having a lead 38 presently to be described. The shutter means 37 comprises a member 39 provided with alternately arranged translucent and opaque bands 40 and 41 respectively. These are so arranged relative to the isolating slits that when light energy may pass through a translucent band 40 and the slit 33, opaque bands 41 block light energy from reaching the transducer 36 via the slits 34 and 35. When an opaque band 41 is in registry with the slit 33, translucent bands 40 are disposed to enable light energy to reach the transducer 36 through the slits 34 and 35. In order to deliver isolated light energy from the sources, relative movement between the slits 33, 34, and 35 and the shutter member 39 is effected, conveniently by reciprocating the shutter member 39 by any desired means.

The indicating means schematically shown in FIG. 3 comprise a microammeter 42 to which signals are fed by a lead 38 through an amplifier 43 and a rectifier 44. The signal displayed on the microammeter 42 represents the corrected signal of the element to be measured at the selected spectral frequency.

In FIG. 5, there are shown isolating slits 45, 46, and 47. The slit 45 is disposed relative to the display of spectral frequencies, suggested at 48, to isolate and provide a source of light energy at a selected characteristic frequency of an element contained in the sample. The slits 46 and 47 are so located that only background radiations are transmitted therethrough to provide a source of background light energy.

A transducer 49 is located to receive light energy from both sources and its lead 50 carries the electrical energy to which the transducer converts the light energy from either source to the indicating means such as those discussed in connection with FIGS. 3 and 4.

In order that the light energy from the sources may be separately converted into electrical energy by the transducer 49, there are shown a pair of rhombic prisms 51. These are shown as mounted on engaged gear segments 52 having parallel supporting shafts 53. By this arrangement, rotation of either shaft 53 results in equal but opposite movement of the prisms 51 and, in accordance with the invention, partial rotation of the shafts is effected by any suitable means to move the prisms 51 between first and second positions. In the first of these, the prisms are in the position shown in FIG. 5 in which isolated background radiations are transmitted to the transducer 49 and, at the same time, the selected frequency of the chosen element is blocked therefrom. In their second position, the prisms 51 are so spaced as to enable isolated light energy representative of the chosen element to reach the transducer 49 while background radiations are blocked therefrom by the prisms 51.

While the invention has thus far been discussed with reference to the quantitative determination of one element present in a sample, it will be appreciated that other elements contained therein may be simultaneously determined by providing a plurality of stations at each of which a selected characteristic frequency of a chosen element is measured and background radiations subtracted therefrom. Multiple determinations may also be effected successively with a single station as suggested in FIG. 6.

In FIG. 6, the illustrative spectrometer has a light source, shown as a flame 54, with a slit 55 directing its light, as a beam, onto a mirror 56 by which it is reflected to a dispersing device 57. The dispersing device 57 produces, in a focal curve, a display of the spectral frequencies, said display being suggested as at 58. In accordance with the invention, both the mirror 56 and dispersing device 57 are indicated as being capable of motion about their respective suggested axes so that the dispersed light may be scanned past a single reference position in the focal plane by the partial rotation of either of them.

At the reference position, a box 59 is located having three slits 60, 61, and 62 in its face and two transducers 63 and 64. The slit 60 is to receive light of a selected spectral frequency characteristic of the chosen element plus background radiations and to transmit such light energies to the transducer 63. The two slits 61 and 62 flank the slit 60 and are to receive background radiations which are to be directed to the transducer 64 by mirrors 65 and 66. It will, therefore, be apparent that by motion of the mirror 56, or the dispersing device 57, or both, a selected spectral frequency can be alined with the slit 60. The slits 61 and 62 are positioned to be then in zones exclusive of the characteristic frequencies of any element present.

It will be apparent that this same effect is attained by movement of the box 59 along the spectral curve as is also suggested in FIG. 6.

In any such relative movement, it is desirable to provide a control by which only background radiations pass through the slits 61 and 62 and only light energy at the selected frequency passes through the slit 60. This control may be accomplished by means of an electronic switch 67 adapted to close when the signal from the transducer 63 is greater than a predetermined minimum value. When closed, it passes signals from both the transducer 63 and the transducer 64 to their respective amplifiers 68 and 69. The output of these amplifiers is united by the measuring bridge 70 so that the signal of the microammeter 71 is an accurate measure of the selected spectral frequency less background radiations.

While other equivalent means of isolating the sources of light energy are contemplated in accordance with the invention, the use of slits as has been discussed with reference to each embodiment is preferred as the simplest means of achieving the desired objective.

What I therefore claim and desire to secure by Letters Patent is:

1. In a multi-channel flame spectrometer for use in quantitative, spectro-chemical studies of a sample containing a plurality of chemical elements and having a slit through which a beam of heterogeneous light resulting from the excitation of the sample is directed to a dispersing device which provides a display of spectral frequencies in a focal curve, the combination of an isolator located with respect to said display to isolate a characteristic frequency of a selected one of the chemical elements present in the sample but including background radiations and establishing a first source of light energy, an isolator located with respect to said display in a zone exclusive of frequencies characteristic of any element in the sample and establishing a second source of light energy, receiving means for the light energy from said sources and operable to convert separately the light energy from each source to electrical energy as a measure of radiations present, and indicating means employing said electrical energies to effect an instantaneous and continuous reading representing the isolated frequency of the selected element less the background radiations actually present.

2. In a multi-channel flame spectrometer for use in quantitative, spectro-chemical studies of a sample containing a plurality of chemical elements and having a slit through which a beam of heterogeneous light resulting from the excitation of the sample is directed to a dispersing device which provides a display of spectral frequencies in a focal curve, the combination of an isolator located with respect to said display to isolate a characteristic frequency of a selected one of the chemical elements present in the sample but including background radiations and establishing a first source of light energy, a pair of isolators located with respect to said display in zones exclusive of frequencies characteristic of any element in the sample and on opposite sides of the first named isolator and including means to combine their light energy to establish a second source of light energy, receiving means for isolated light energy, one for each source and operable to convert the light energy therefrom to electrical energy as a measure of radiations present, and indicating means employing the electrical energies from said receiving means to effect an instantaneous and continuous reading representing the isolated frequency of the selected element less background radiations actually present.

3. In a multi-channel flame spectrometer for use in quantitative, spectro-chemical studies of a sample containing a plurality of chemical elements and having a slit through which a beam of heterogeneous light resulting from the excitation of the sample is directed to a dispersing device which provides a display of spectral frequencies in a focal curve, the combination of an isolator located with respect to said display to isolate a characteristic frequency of a selected one of the chemical elements present in the sample but including background radiations and establishing a first source of light energy, an isolator located with respect to said display in a zone exclusive of frequencies characteristic of any element in the sample and establishing a second source of light energy, receiving means, one for each source and operable to convert the light energy therefrom to electrical energy, and indicating means employing the electrical energies from each receiving means to effect an instantaneous and continuous reading representing the isolated frequency of the selected element less background radiations actually present.

4. In a multi-channel flame spectrometer for use in quantitative, spectro-chemical studies of a sample containing a plurality of chemical elements and having a slit through which a beam of heterogeneous light resulting from the excitation of the sample is directed to a dispersing device which provides a display of spectral frequencies in a focal curve, the combination with said display of a device to isolate a characteristic frequency of a selected one of the chemical elements present in the sample but including background radiations, and establishing a first source of light energy, and simultaneously to isolate background radiations as a second source of light energy, said device including separate means to convert continuously the light energy from each of said sources to electrical energy and to amplify such energy, and indicating means employing said amplified electrical energies to effect an instantaneous and continuous reading representing the isolated frequency of the selected element less the background radiations actually present.

References Cited in the file of this patent

UNITED STATES PATENTS

| | | |
|---|---|---|
| 1,794,222 | Whitney | Feb. 24, 1931 |
| 2,577,815 | Saunderson et al. | Dec. 11, 1951 |
| 2,734,418 | Enns | Feb. 14, 1956 |

OTHER REFERENCES

Saunderson et al.: A Photoelectric Instrument for Direct Spectrochemical Analysis, pages 681–697 in Journal of the Optical Society of America, vol. 35, No. 11, November 1945.